United States Patent [19]

Onose et al.

[11] Patent Number: 5,121,543
[45] Date of Patent: Jun. 16, 1992

[54] PORTABLE CIRCULAR SAW HAVING SAWDUST DISCHARGE ARRANGEMENT

[75] Inventors: Akira Onose; Hiroshi Sato; Ryoji Tuchida, all of Katsuta, Japan

[73] Assignee: Hitachi Koki Co., Ltd., Tokyo, Japan

[21] Appl. No.: 787,610

[22] Filed: Nov. 4, 1991

[30] Foreign Application Priority Data

Nov. 22, 1990 [JP] Japan .............................. 2-123473[U]

[51] Int. Cl.$^5$ .............................................. B25F 5/02
[52] U.S. Cl. ........................................ 30/124; 30/391
[58] Field of Search ................ 30/124, 388, 390, 391; 51/268, 273; 125/13.01

[56] References Cited

U.S. PATENT DOCUMENTS

| 3,123,111 | 3/1964 | Mattson . | |
|---|---|---|---|
| 3,245,439 | 4/1966 | Sheps et al. | 30/390 X |
| 3,267,974 | 8/1966 | Elson . | |
| 3,662,796 | 5/1972 | Batistelli . | |
| 4,221,051 | 9/1980 | Glass | 30/377 |
| 5,033,192 | 7/1991 | Franz et al. | 30/124 |

Primary Examiner—Douglas D. Watts
Attorney, Agent, or Firm—Sughrue, Mion, Zinn, Macpeak & Seas

[57] ABSTRACT

A portable circular saw device having sawdust discharge arrangement which prevents sawducts from being discharged toward an operator. The circular saw has an upper blade guard which has one side wall and an opposite side wall, and a discharge opening is formed at the one side wall for discharging, through the discharge opening the sawdusts laterally away from the operator. For further ensuring this lateral discharge of the sawdusts, a deflector is provided at the one side wall at a position close to an upstream edge of the discharge opening. The deflector protrudes from an inner surface of the one side wall toward the opposite wall for directing the sawducts passing along the inner surface of the one side wall toward an end portion on which the sawducts are reflected and are then directed to a direction perpendicular to the moving locus of the sawdusts.

4 Claims, 2 Drawing Sheets

PORTABLE CIRCULAR SAW HAVING SAWDUST DISCHARGE ARRANGEMENT

BACKGROUND OF THE INVENTION

The present invention relates to a motor driven portable circular saw, and more particularly, to a type thereof having an improved sawdust discharge arrangement.

One example of a conventional portable circular saw is shown in FIG. 1. The circular saw includes a housing frame 1 on which a hand grip portion 6 is integrally mounted for depressing and advancing the entire circular saw relative to a workpiece W (FIG. 2). In the housing frame 1, a drive motor (not shown) and a gear transmission mechanism (not shown) are accommodated. The gear transmission mechanism has an drive shaft on which a circular saw blade 2 is fixedly coupled. Thus, upon energization of the drive motor, the circular saw blade 2 is rotated about an axis of the drive shaft in a direction indicated by an arrow A through the gear transmission mechanism. An upper half portion of the circular saw blade 2 is covered with an upper blade guard 3 fixedly secured to the housing frame 1. The upper blade guard 3 has a semicircular shape and has a side web 3a formed with a sawdust discharge opening 4 through which sawdusts are discharged outside of the upper blade guide 3. The discharge opening 4 has an upstream end 4a and a downstream end 4b with respect to a flowing direction of the sawdusts. The upper blade guard 3 has anther side wall 3b (FIG. 3) confronting the one side wall 3a to provide a semicircular discharge passage 3c therebetween.

Further, a lower blade guard 7 is rotatably mounted on the drive shaft through a boss (not shown) for covering a lower half portion of the circular saw blade 2 during non-service state of the circular saw. The lower blade guard 7 has one side provided with an arcuate web 7a, and has another side provided with a sector plate (not shown) which is rotatably supported to the boss. The lower blade guard 7 is normally biased by a spring (not shown) toward its close position in a direction indicated by an arrow B. In such closed position, the lower blade guard 7 cooperates with the upper blade guard 3 to enclose substantially all the teeth of the circular saw blade 2. Incidentally, detailed arrangement of the lower blade guard is disclosed in U.S. Pat. No. 4,221,051.

For chopping the workpiece W, the drive motor is energized for rotating the circular saw blade 2 in the direction A, while an operator holds the hand grip portion 6. In this case, a front end of the lower blade guard 7 abuts the workpiece W and is pivotally moved toward open position against the biasing force of the spring in accordance with the forward motion of the housing frame 1, so that the lower blade guard 7 is gradually inserted into the upper blade guard 3. In this case, a sufficient space is provided between the upper blade guard 3 and the pivotally inserted lower blade guard 7 to provide the semicircular discharge passage 3c (FIG. 3) for example, a distance of 10 to 20 mm is provided between the upper and lower blade guards 3 and 7 when the lower blade guard 7 is positioned within the upper blade guard 3. Therefore, sawdusts upwardly urged by the circular saw blade 2 can pass through the circular passage 3c and along an inner peripheral surface of the upper blade guard 3, and are discharged outside through the dust opening 4 as shown in FIG. 2.

The upper blade guard 3 has an arcuate end wall 3d contiguous with the discharge opening 4 for terminating the discharge passage 3c and for changing orientation of the sawdusts passing through the discharge passage 3c. Thus, the end wall 3d is connected to the downstream end 4b of the discharge opening 4.

With this structure, most of the sawdusts discharged through the discharge opening 4 are not directed toward the operator but are laterally directed as shown by an arrow D in FIG. 3, since the discharge opening 4 is formed and opened at the side web portion 3a of the upper blade guard 3, and since the end wall 3d guide such travel of the sawdusts. However, several sawdust are directed toward the operator as shown by an arrow E due to uneven flowing modes of the sawdusts within the discharge passage. In other words, several sawdusts do not flow along the inner peripheral surface of the other side wall 3b of upper blade guard 3 nor along the end wall 3d, but the dusts are ejected toward the operator substantially linearly if the sawdusts do not undergo guiding by the end wall 3d. Thus the sawdusts flowing along the arrow E may degrade the chopping work. That is, the discharge opening 4 is formed in the upper blade guard 3 at relatively downstream side portion thereof for effectively discharging the sawdusts. Thus, the downstream position, i.e., the discharge opening 4 is positioned close to the operator. Consequently, the sawdusts passing along the locus E may easily splashes on the operator.

SUMMARY OF THE INVENTION

It is therefore, an object of the present invention to provide a portable circular saw having an improved sawdust discharging arrangement capable of preventing the discharged sawdusts from directing toward an operator through a discharge opening, to thereby enhance chopping workability.

This and other objects of the invention will be attained by providing a circular saw which includes a housing frame, a power source disposed in the housing frame, a circular saw blade connected to the power source, an upper blade guard, and deflecting means. The upper blade guard is fixed to the housing frame for covering an upper half portion of the circular saw blade. The upper blade guard has one side wall formed with a sawdust discharge opening, an another side wall confronting the one side wall, and an end wall connected between the one and another side walls. A discharge passage is defined at a space between the upper blade guard and the circular saw blade. The discharge opening defines an upstream side edge and a downstream side edge with respect to a flowing direction of sawdusts passing through the discharge passage. The deflecting means is positioned at the upstream edge of the discharge opening and protruding from its inner surface toward the another side wall of the upper blade guard.

DETAILED DESCRIPTION OF THE PREFERRED EMBODIMENT

Figure 1:
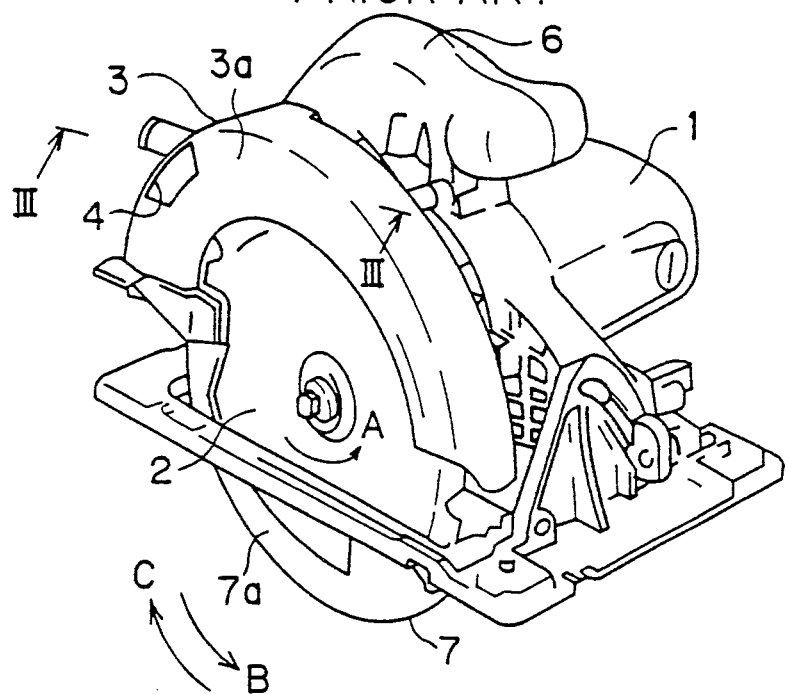
FIG. 1 is a perspective view showing a conventional circular saw.
Figure 2:
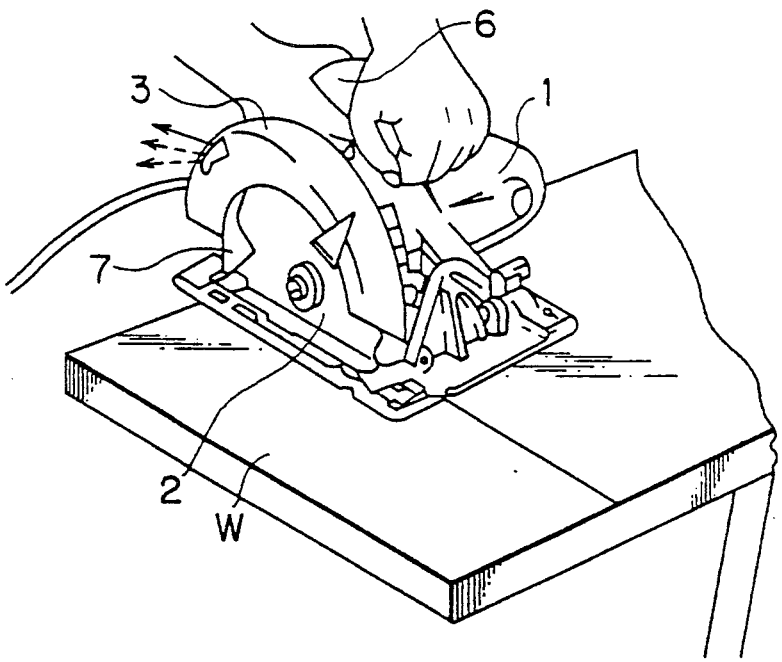
FIG. 2 is a perspective view showing an operational state of the conventional circular saw.
Figure 3:
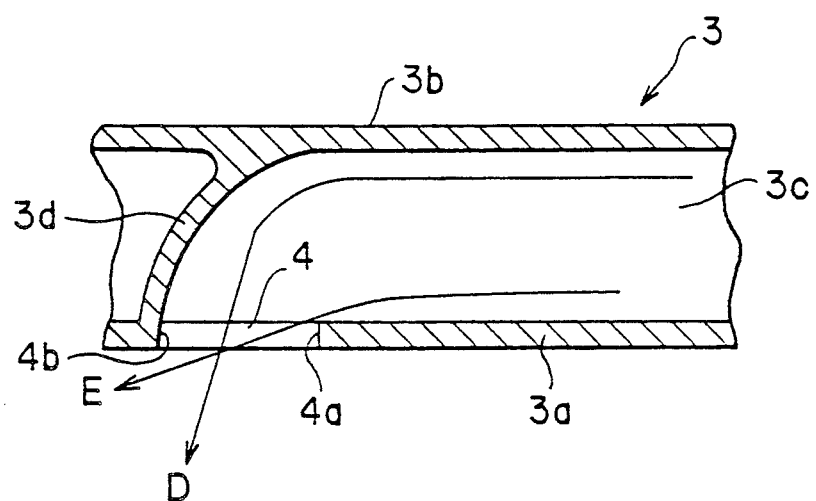
FIG. 3 is a cross-sectional view taken along a line III—III of FIG. 1 showing an internal arrangement at sawdust discharge area according to the conventional circular saw.
Figure 4:
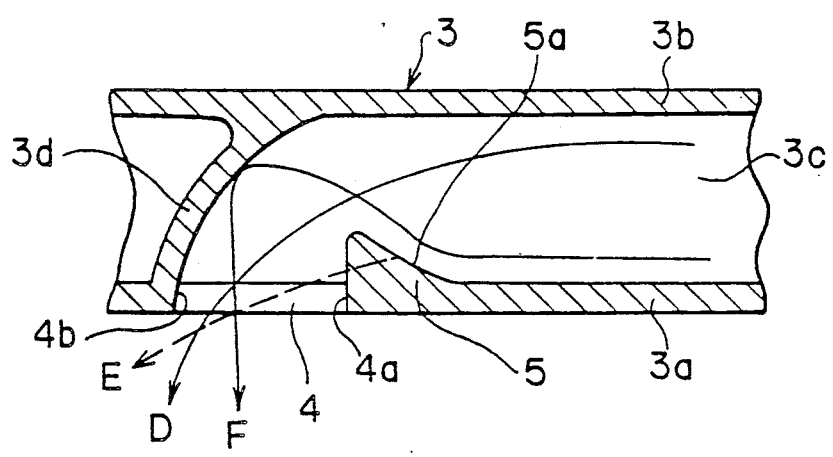
FIG. 4 is a cross-sectional view taken along the same line III—III but showing an internal arrangement at sawdust discharge area according to one embodiment of the present invention.

A portable circular saw according to one embodiment of the present invention will be described with reference to FIG. 4, wherein like parts and components are designated by the same reference numerals as those shown in FIGS. 1 through 3. In this embodiment, most of the parts and components are the same as the conventional arrangement except an internal arrangement of the sawdust discharge area at position adjacent a discharge opening 4. That is, at a position adjacent an upstream end 4a of the discharge opening 4, a deflector 5 is provided. the deflector 5 projects from an inner surface of the one side wall 3a toward the opposite side wall 3b. The deflector 5 has a deflecting surface 5a extending toward an arcuate end wall 3d.

With this arrangement, part of the sawdusts flow along the inner peripheral surface of the opposite wall 3b and along the arcuate end wall 3d as shown by an arrow D, similar to the conventional arrangement so as to direct the sawdusts laterally away from the operator. Further, remaining part of the sawdusts passing along the inner surface of the one side wall 3a flows along the deflecting surface 5a and are directed toward the arcuate end wall 3d. The thus directed sawdusts are impinged on the end wall 3d and are reflected therefrom toward the lateral direction as indicated by an arrow F. Thus, all sawdusts are not oriented toward the operator, but are directed laterally to avoid sawdusts showering over the operator.

In the depicted embodiment, the lower blade guard is provided for covering the lower half portion of the circular saw blade during non-operational state of the circular saw. However, the lower blade guard can be dispensed with to provide economical circular saw. In this case, the sawdust discharge passage is provided at a space between the circular saw blade and the upper blade guard, and it goes without saying that the deflector shown in FIG. 4 is provided at the upper blade guard in the economical circular saw.

While the invention has been described in detail and with reference to specific embodiment thereof, it would be apparent to those skilled in the art that various changes and modifications may be made therein without departing from the spirit and scope of the invention.

What is claimed is:

1. A circular saw including:
   a housing frame;
   a power source disposed in the housing frame;
   a circular saw blade connected to the power source;
   an upper blade guard fixed to the housing frame for covering an upper half portion of the circular saw blade, the upper blade guard having one side wall formed with a sawdust discharge opening, an another side wall confronting the one side wall, and an end wall connected between the one and another side walls, a discharge passage being defined at a space between the upper blade guard and the circular saw blade, and the discharge opening defining an upstream side edge and a downstream side edge with respect to a flowing direction of sawdusts passing through the discharge passage; and the improvement comprising:
   deflecting means positioned at the upstream edge of the discharge opening and protruding from an inner surface of the one side surface toward the another side wall of the upper blade guard.

2. The circular saw as claimed in claim 1, wherein the deflecting means has a deflecting surface extending toward the end wall for directing the sawdusts which pass along the inner surface of the one side wall toward the end wall and for directing the sawdusts in a direction substantially perpendicular to the discharge passage after the reflection of the sawdusts at the end wall.

3. The circular saw as claimed in claim 1, further comprising a lower blade guard pivotally movably provided for covering a lower half portion of the circular saw blade, the lower blade guard being movable between a close position where the lower half portion of the circular saw blade is covered by the lower blade guard and an open position where the lower blade guard is positioned inside the upper blade guard to expose the lower portion of the circular saw blade for chopping, the discharge passage being defined between the upper and lower blade guards when the lower blade guard has the open position.

4. The circular saw as claimed in claim 2, further comprising a lower blade guard pivotally movably provided for covering a lower half portion of the circular saw blade, the lower blade guard being movable between a close position where the lower half portion of the circular saw blade is covered by the lower blade guard and an open position where the lower blade guard is positioned inside the upper blade guard to expose the lower portion of the circular saw blade for chopping, the discharge passage being defined between the upper and lower blade guards when the lower blade guard has the open position.

* * * * *